L. W. Reed.
Pipe Coupling
N° 97,963. Patented Dec. 14, 1869.
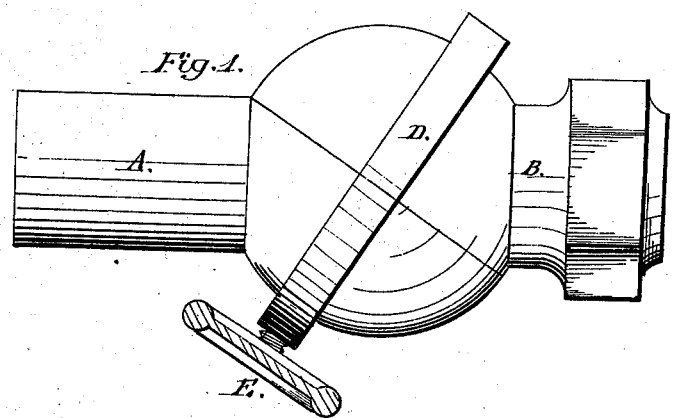
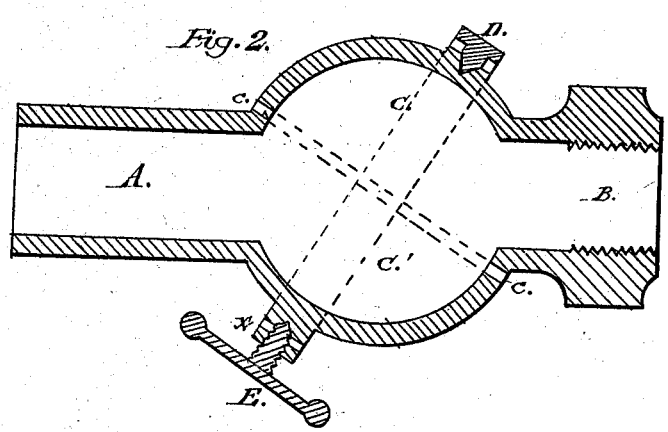
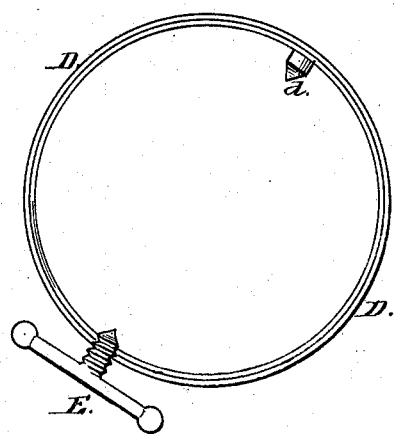
Witnesses:
Charles B. Hile
Joseph Chandler
Inventor:
Leonard W. Reed

United States Patent Office.

LEONARD W. REED, OF EAST CAMBRIDGE, MASSACHUSETTS.

Letters Patent No. 97,963, dated December 14, 1869.

IMPROVEMENT IN PIPE-COUPLINGS.

The Schedule referred to in these Letters Patent and making part of the same

*To all whom it may concern:*

Be it known that I, LEONARD W. REED, of East Cambridge, in the county of Middlesex, and State of Massachusetts, have invented certain new and useful Improvements in Pipe-Couplings; and do hereby declare that the following is a full, clear, and exact description of the same, reference being had to the accompanying drawings, making a part of this specification, in which—

Figure 1 is a side elevation of my improved device;

Figure 2 is a vertical longitudinal section of the same; and

Figure 3 is a detached view of the ring-clamp, for securing together the sections of the coupling.

Letters of like name and kind refer to like parts in each of the figures.

My invention relates to a class of devices used for securing or coupling together the ends of metal pipes; and It consists in the employment of a coupling, composed of two sections, constructed and secured together in the manner hereinafter described, so as to permit said sections to be readily connected together or separated, and also, to allow of their relative adjustment, so as to bring the longitudinal openings therein in a line with or at any desired angle to each other.

In the annexed drawing is shown a coupling, consisting of two sections, A and B, having in its centre, lengthwise, a hollow globe or sphere, C and C', which is divided through its centre, and the line of the division placed at an angle with or diagonally to the longitudinal opening through said coupling.

Projecting forward from the outer edge of one part of said sphere C, is an angular lip or flange, c, which fits into a corresponding groove in the opposite part C', and holds said parts in position laterally, while allowing either to be rotated upon or separated from the other.

The contiguous edges of the parts C and C' being ground together so as to produce a steam or water-tight joint, the whole is firmly bound together by means of a ring, D, passing around the sphere, and provided with a thumb-screw, E, which passes through said ring, and bears against one side or part of said sphere.

In order that the clamps may be more readily adjusted in place, with the pressure applied directly over the centre, radially of each half of the sphere, two bosses $x\,x$ are cast at that point upon said halves, and are each provided with a conical countersink, for receiving the pointed ends of the screw E, and of a pin, $d$, projecting inward, from opposite side of the ring D.

As thus constructed, it will be seen that the sections of the coupling can be readily and firmly secured together, or as quickly separated, and that from the construction and application of the clamp, it will be impossible for it to become loosened by the jarring or motion of machinery, and also, that by rotating one portion of the sphere upon the other, the relative positions of the sections will be changed, so as to produce an elbow-coupling, having any desired angle.

Having thus fully set forth the nature and merits of my improvement,

What I claim as new, and desire to secure by Letters Patent, is—

The within-described adjustable coupling, consisting of the sections A and B, secured together by means of the clamp-ring D and screw E, substantially as and for the purpose specified.

LEONARD W. REED.

Witnesses:
CHARLES B. HILL,
JOSEPH CHANDLER.